No. 674,815. Patented May 21, 1901.
C. H. PUFFER.
THILL JACK FOR VEHICLES.
(Application filed Oct. 13, 1900.)
(No Model.)

Witnesses

Inventor
C. H. Puffer
By Victor J. Evans, Attorney

UNITED STATES PATENT OFFICE.

CHAUNCEY H. PUFFER, OF CANANDAIGUA, NEW YORK.

THILL-JACK FOR VEHICLES.

SPECIFICATION forming part of Letters Patent No. 674,815, dated May 21, 1901.

Application filed October 13, 1900. Serial No. 32,976. (No model.)

*To all whom it may concern:*

Be it known that I, CHAUNCEY H. PUFFER, a citizen of the United States, residing at Canandaigua, in the county of Ontario and State of New York, have invented new and useful Improvements in Thill-Jacks for Vehicles, of which the following is a specification.

My invention relates to thill-jacks for vehicles, the object being to provide a simple and inexpensive device for supporting the thills or tongue of a vehicle in raised position when the vehicle is not in use.

The invention comprises two curved bars suitably connected together and provided with means for adjusting them with relation to each other to vary the height or elevation of the thills or tongue and to adapt the device for use with vehicles of all kinds.

The construction of the improvement will be fully described hereinafter in connection with the accompanying drawings, which form part of this specification, and its novel features will be defined in the appended claims.

Figure 1:
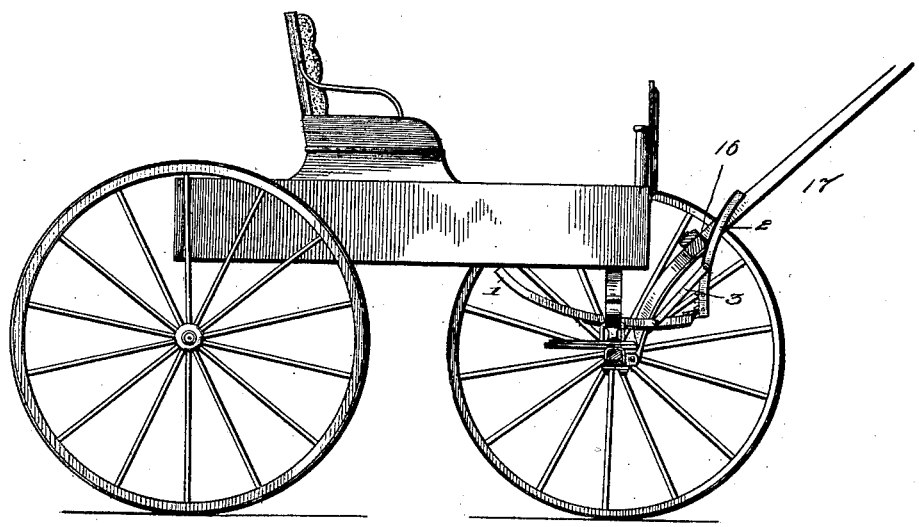
Figure 2:
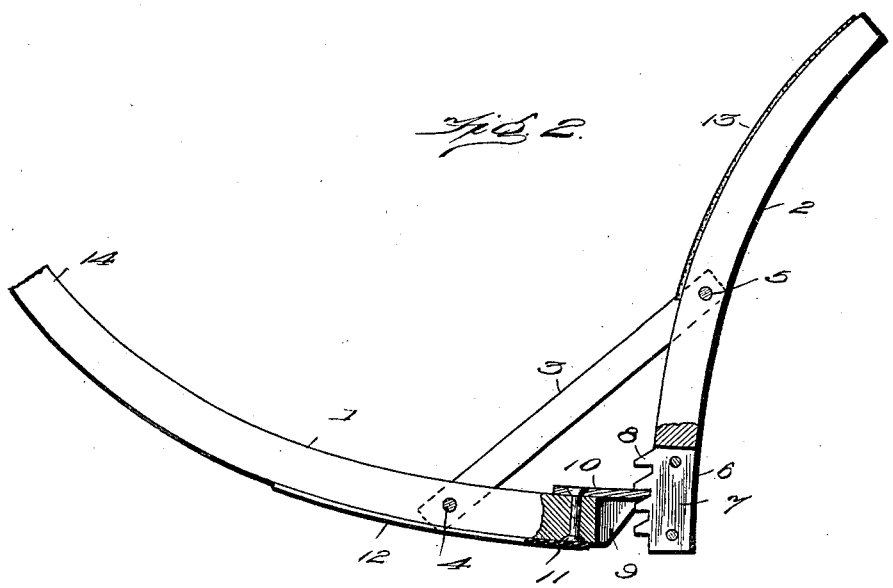

In the drawings, Figure 1 is a side elevation of a buggy with my improved thill-jack applied thereto. Fig. 2 is a side elevation, partly in section, of the jack removed from the vehicle and on an enlarged scale.

The reference-numerals 1 and 2 respectively designate curved bars secured together by parallel links 3, the ends of which are pivotally secured by cross-pins 4 and 5 to the bars 1 and 2. The lower end of the bar 2 is formed with a central slot or recess 6 to receive a plate 7, formed with rack-teeth 8, and the forward end of the bar 1 is formed with a slot 9, within which the teeth are adapted to project.

10 designates a plate secured, by means of a bolt 11, to the upper side of the bar 1, at the forward end thereof, and projecting beyond said forward end to serve as a dog or catch to engage the teeth of the plate 7.

The under surface of the bar 1 is provided with a covering or cushion 12, of felt or like yielding material, and the upper surface of the bar 2 is provided with a similar covering 13, said coverings serving as bearing-surfaces to prevent marring the vehicle at the points where it contacts with the jack.

The utility of the device will be readily understood from the illustration in Fig. 1 of the drawings. The curved bar 1 is adapted to rest upon the front axle or front bolster of the vehicle, with its rear end 14 bearing against the under surface of the vehicle-body or some portion of the running-gear of the vehicle to prevent rearward movement of the bar 1, and the bar 2, as clearly shown in Fig. 1, is adapted to bear against the cross-bar 16, which connects the thills 17.

As will be apparent, the bar 2 may be readily adjusted with relation to bar 1 by means of the toothed plate 7 and the catch or dog 10, the pivoted links 3 permitting such adjustment.

While the construction illustrated in the drawings is a practical embodiment of the invention, I would have it understood that other means than those shown for adjusting the bar 2 may be resorted to without departing from the spirit of my invention and that the latter is not restricted to the precise construction shown, but includes all such modifications and changes in the details of construction as may properly fall within the scope of the following claims.

I claim—

1. A thill-jack comprising two curved bars; pivoted links connecting said bars together; a toothed plate secured to one of said bars; and a plate secured to the other bar and formed with a projection to engage said toothed plate.

2. A thill-jack comprising two curved bars, links which secure the bars loosely together; a plate secured within a slot at the lower end of one of said bars and having projecting teeth; a plate secured to the other bar and having a projection adapted to engage said teeth.

In testimony whereof I affix my signature in presence of two witnesses.

CHAUNCEY H. PUFFER.

Witnesses:
F. A. PANUELE,
H. M. FIELD.